(12) United States Patent
Dooner

(10) Patent No.: US 9,016,997 B2
(45) Date of Patent: Apr. 28, 2015

(54) SENSING SAFETY DEVICES

(71) Applicant: SafetyTrim Worldwide Holdings Limited, Middlesex (GB)

(72) Inventor: Nicholas Dooner, Surrey (GB)

(73) Assignee: Safety Trim Worldwide Holdings, Ltd., Middlesex (GB)

( * ) Notice: Subject to any disclaimer, the term of this patent is extended or adjusted under 35 U.S.C. 154(b) by 0 days.

(21) Appl. No.: 14/249,823

(22) Filed: Apr. 10, 2014

(65) Prior Publication Data

US 2014/0219746 A1    Aug. 7, 2014

Related U.S. Application Data

(63) Continuation-in-part of application No. 13/649,968, filed on Oct. 11, 2012, and a continuation-in-part of application No. 13/649,921, filed on Oct. 11, 2012.

(60) Provisional application No. 61/561,639, filed on Nov. 18, 2011.

(30) Foreign Application Priority Data

Oct. 11, 2011    (AU) .................................. 2011235942

(51) Int. Cl.
*F16B 37/14*    (2006.01)
*F16B 1/00*    (2006.01)
(Continued)

(52) U.S. Cl.
CPC ............... *F16B 1/0071* (2013.01); *F16B 37/14* (2013.01); *B60B 7/068* (2013.01); *B60B 3/165* (2013.01); *F16B 31/02* (2013.01); *F16B 39/101* (2013.01); *B60B 2310/316* (2013.01); *B60B 2320/52* (2013.01); *B60B 2360/32* (2013.01); *B60B 2360/368* (2013.01); *B60B 2900/211* (2013.01); *B60B 2900/3312* (2013.01); *B60B 2900/3316* (2013.01); *B60B 2900/5112* (2013.01); *B60B 2900/531* (2013.01); *B60B 2900/541* (2013.01); *B60B 2900/571* (2013.01); *B60B 2900/721* (2013.01); *F05B 2260/301* (2013.01); *B60B 2320/524* (2013.01)

(58) Field of Classification Search
USPC .............. 411/8, 13–14, 337, 372.5, 373, 429, 411/431; 116/281, 284, 286; 301/35.623, 301/35.624
See application file for complete search history.

(56) References Cited

U.S. PATENT DOCUMENTS 4,346,940 A    8/1982  Tatar
4,569,229 A    2/1986  de Halleux
(Continued)

FOREIGN PATENT DOCUMENTS

CA    2206849    12/1998
CA    2224538 A1    6/1999
(Continued)

*Primary Examiner* — Roberta Delisle
(74) *Attorney, Agent, or Firm* — Fish & Tsang, LLP

(57) ABSTRACT

Safety apparatuses for objects having at least one nut are disclosed. Contemplated apparatuses comprise a base, one or more nut caps, and one or more electronic sensors configured to acquire data related to a corresponding nut, wheel or tire. In some embodiments, a physical nut rotation indicator that can readily be observed by an operator is included, and a retention wall disposed on the base can operate in conjunction with the physical nut rotation indicator to block a rotation of a nut. Apparatuses are preferably configured to remain stable in harsher environments.

19 Claims, 5 Drawing Sheets

(51) Int. Cl.
  *B60B 7/06*   (2006.01)
  *B60B 3/16*   (2006.01)
  *F16B 31/02*   (2006.01)
  *F16B 39/10*   (2006.01)

(56) References Cited

U.S. PATENT DOCUMENTS

| | | | |
|---|---|---|---|
| 4,906,150 A | 3/1990 | Bennett | |
| 5,552,759 A | 9/1996 | Stoyka | |
| 6,135,691 A | 10/2000 | Nadarajah | |
| 7,012,511 B2 * | 3/2006 | Hayes | 340/438 |
| 7,412,898 B1 | 8/2008 | Smith | |
| 7,994,901 B2 | 8/2011 | Malis | |
| 8,388,670 B1 | 3/2013 | Zou | |
| 8,763,627 B2 * | 7/2014 | Richards | 137/343 |
| 2002/0089231 A1 | 7/2002 | Marczynski | |
| 2002/0122711 A1 | 9/2002 | Porter | |
| 2003/0000314 A1 * | 1/2003 | Smith et al. | 73/849 |
| 2005/0254920 A1 | 11/2005 | Baughman | |
| 2007/0180937 A1 | 8/2007 | Thomson | |
| 2007/0210640 A1 | 9/2007 | Rogers | |
| 2008/0253858 A1 | 10/2008 | Hsieh | |
| 2009/0060677 A1 | 3/2009 | Adams | |
| 2009/0207008 A1 | 8/2009 | Malis | |
| 2010/0054891 A1 | 3/2010 | Nishida | |
| 2011/0133542 A1 | 6/2011 | Ratti | |
| 2011/0181393 A1 | 7/2011 | Tillotson | |
| 2012/0234402 A1 * | 9/2012 | Richards | 137/343 |
| 2013/0049952 A1 | 2/2013 | Schnare | |
| 2013/0209194 A1 | 8/2013 | Kratzer | |

FOREIGN PATENT DOCUMENTS

| | | |
|---|---|---|
| DE | 4002259 A1 | 8/1991 |
| DE | 19917222 A1 | 11/2000 |
| DE | 102009043267 A1 | 4/2011 |
| EP | 1312812 A2 | 5/2003 |
| EP | 1538351 A1 | 6/2005 |
| GB | 2260177 A | 4/1993 |
| GB | 2325504 A | 11/1998 |
| GB | 2351134 B | 9/2002 |
| GB | 2409251 A | 6/2005 |
| GB | 2409888 A | 7/2005 |
| GB | 2393487 B | 2/2007 |
| JP | 7280762 A | 10/1995 |
| JP | 10317306 A | 12/1998 |
| WO | 0247924 A1 | 6/2002 |
| WO | 2005-021983 A1 | 3/2005 |
| WO | 2007090986 A2 | 8/2007 |
| WO | 2008128147 A1 | 10/2008 |

* cited by examiner

SENSING SAFETY DEVICES

This application is a continuation-in-part of U.S. patent application Ser. Nos. 13/649,921 and 13/649,968, each filed on Oct. 11, 2012, and each of which claims the benefit of priority to U.S. provisional application having Ser. No. 61/561,639 filed on Nov. 18, 2011, and Australian patent application number 2011/235942 filed on Oct. 11, 2011. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is safety devices, and more specifically safety devices for use on objects having one or more nuts, bolts or other fasteners.

BACKGROUND

The following background discussion includes information that may be useful in understanding the present invention. It is not an admission that any of the information provided herein is prior art or relevant to the presently claimed invention, or that any publication specifically or implicitly referenced is prior art.

Wheeled vehicles (e.g., trucks, cars, etc.) secure wheels to an axle via a rim held in place by a plurality of nuts. During a normal course of traveling, the nuts can progressively loosen to the point where the wheel is no longer properly secured typically as a result of heat transfer, often through braking where expansion and contraction of the stud bolts occurs. As the stud bolts lengthen the nut torque pressure becomes reduced, allowing the nut to loosen and centrifugal force to undo the nut. In some scenarios, the wheel can detach from the vehicle during travel resulting in a severe safety hazard. There exist numerous documented cases of bystanders being severely injured or dying as a result of detached wheels.

United States Patent Application Pub. No. 2002/0122711 to Porter titled "Wheel nut retainer," filed on Mar. 2, 2001 attempts to resolve these issues and describes a retainer for securing a truck wheel nut to a rim clamp of a wheel to prevent the wheel nut from turning relative to the rim clamp. Unfortunately, the device of Porter can only be secured to a truck wheel. Moreover, a separate device would need to be attached to each wheel nut and Porter does not provide an indicator to signal loosening of a wheel nut. A more desirable solution would be a device that works on more than one wheel nut and indicates that the nut is loose.

International Application WO 2007/090986 to De Lima titled "Safety apparatus for vehicle wheel," filed on Feb. 5, 2007 and United Kingdom Patent Application GB 2325504 to Rowledge titled "Device to prevent loosening of wheel nuts," filed on Dec. 29, 1997 attempt to address these issues and describe safety apparatuses for vehicles that include retention walls to prevent the complete loosening of wheel nuts. De Lima provides an anti-rotation means designed to co-operate with the wheel nuts. Rowledge provides a ring member with a retaining rim. Unfortunately, the devices of De Lima and Rowledge do not include nut caps to protect the wheel nuts from debris and dust, or internal ribs for structural support to reduce the flexibility of the devices. More significantly, they do not provide any easily identifiable indicators to signal the loosening of the wheel nut to the vehicle operator. A more desirable solution would include such an indicator.

Canada Patent Application CA 2206849 to Keenan titled "Truck wheel retaining device and alarm system," filed on Jun. 3, 1997 attempts to resolve such issues and discloses a system that provides an alarm to warn the vehicle operator of a loose wheel. While Keenan provides electronic signals to vehicle operator when a wheel is loose, it does not provide such a signal with respect to other types of significant data, nor an external validation for inspectors walking around the car.

Yet another example is United Kingdom Patent GB 2393487 to Knight titled "Wheel nut indicator and retention device", filed Aug. 29, 2002. The disclosed approach by Knight provides an exposed indictor of a loosening wheel. However, Knight's device apparently lack alert holes, requiring the tab to protrude past a perimeter of the base, and fails to provide optimal durability and versatility.

What the above references seemingly fail to provide is a system that can be easily installed and understood by an average vehicle operator, remain stable and effective in a wide range of harsher environments with respect to a wide range of factors, and provide external validation for inspectors. Thus, there is still a need for improved nut safety devices.

SUMMARY OF THE INVENTION

The inventive subject matter provides apparatus, systems and methods in which a safety apparatus comprises a base, a nut cap rotatably coupled with the base, and at least one electronic sensor coupled with the base and configured to obtain at least one of a nut data and a wheel data. While a device of the inventive subject matter could comprise more than one electronic sensor, one sensor should be sufficient for many applications (where the object to which the device is attached is rotating), since a loosening of one nut is often quickly followed by other nuts of the object loosening. In some aspects, the base comprises a top surface (i.e., outside or lateral portions when placed on a vehicle wheel) and a bottom surface (i.e., inside or medial portions when placed on a vehicle wheel), and the nut cap protrudes from the outside portion of the base.

Additionally or alternatively, a nut rotation indicator could be coupled with the nut cap and configured to rotate with the nut cap. The indicator could be positioned under the bottom surface (e.g., juxtaposing and rotating along the inside surface, etc.) of the base and configured to rotate between first and second retention walls of the base. Where nut data is acquired by the at least one electronic sensor, a contact region (e.g., a contact strip, wires, etc.) could be coupled to the base (e.g., on a retention wall, etc.) such that when the indicator's conductive portions contact the strip, an alert or other data is sent to the at least one electronic sensor. The retention wall could be of sufficient strength to block a rotation of a nut rotation indicator (and corresponding nut when used).

The one or more electronic sensors, when included, could be disposed within or on any portion of the safety apparatus (e.g., base, nut cap, indicator, indicator pathway, etc.). For example, a sensor could be disposed within an indicator pathway or other recessed portion of an inside surface. Preferably, the sensor has a thickness that is less than or equal to a thickness of a retention wall or other non-recessed portion of the inside surface. This would allow the safety apparatus to substantially seal against a nut supporting surface of a device (e.g., wheel rim, etc.) even where a sensor is placed on the base. The electronic sensor could be coupled to any suitable power source, including for example, a photovoltaic cell, a button cell, or any suitable battery or other power unit, which could also be coupled with any portion of the safety apparatus (e.g., base, nut cap, indicator, indicator pathway, etc.). Additionally or alternatively, at least one of an electronic sensor and a power source could be partially or completely encased in a rubber composite material that protects the components from the elements.

It is contemplated that an electronic sensor could comprise any suitable type of sensor configured to acquire any suitable data related to a nut or object (e.g., wheel, etc.) on which it is placed. For example, one or more electronic sensors placed on one or more safety apparatuses of a vehicle could obtain, among other things, data indicative of a rotation of one or more nuts or other feature; data indicative of a wheel rotation count, wheel rotation speed, wheel temperature, wheel imbalance, a wobble, a wash-boarding (i.e., wear pattern in bands across a width of a tire, which achieves an effect for the driver similar to driving on a washboard road); or data indicative of a tire pressure.

Once the sensor data is collected by the one or more electronic sensors, it is contemplated that some or all of the data could be transmitted to a device for instantiation on a display of the device via one or more sensor interfaces. The instantiation can be of the raw sensor data, or a summarized/modified version thereof. Contemplated devices include, among other things, a mobile device, a cell phone, a computer, a tablet, a vehicle display or any other device capable of obtaining sensor data or summaries thereof. The device could be one carried by an operator of the object using the safety apparatus, disposed inside a vehicle using the safety apparatus, or disposed in a control center associated with a company monitoring a plurality of safety apparatuses on a plurality of objects.

In further aspects of the inventive subject matter, contemplated safety apparatuses could comprise one or more lights (e.g., LED lights, fluorescent lights, etc.) that are configured to provide a visual alert to a driver or other user. The visual alert could be indicative of a loosening of a nut (e.g., where a conductive tip of an indicator comes into contact with a contact strip, pad or region, etc.), a high wheel temperature (e.g., over a specified temperature, etc.) or any other condition related to a nut or corresponding object.

A visual indication via one or more lights could include any suitable visual indication, including for example, a turning on of one or more lights, a turning off of one or more lights, a change in color, a change in brightness, a change in pattern, or a combination thereof. Additionally or alternatively, the one or more lights could be used to display a logo, a trademark, an advertisement, a design, or any other desired text or image. It is also contemplated that a non-visual indication could be provided via one or more interfaces, including for example, an audio indication via a speaker.

Additionally or alternatively, safety apparatuses of the inventive subject matter could be configured to couple to any suitable object having a nut and bolt, heat or friction, including for example, a pipeline, a flange, a vehicle, a truck, a crane, a rail (rolling stock or track), a propeller, a plant, a machine, a scaffolding, a marine engine, a holding bed or plate, a wind turbine, or an oil rig.

The safety devices can advantageously be made of a material that is corrosion and heat resistant, such as a Nylon-6,6, making the device suitable for use on objects under extreme conditions, for example, an underwater oil platform, an agricultural landscape, a mining field, or other harsh environment.

Contemplated safety apparatuses can additionally or alternatively have a plurality of nut caps having tapered internal splines configured to form a strong interference or vacuum fit around corresponding nuts such that dust and other contaminants are substantially or completely blocked. One or more of the nut caps have a physical nut rotation indicator configured to rotate when a corresponding nut loosens. In some aspects of the inventive subject matter, devices can comprise a retention wall or rotation stop configured to restrict the rotation of an indicator, a nut cap, or a corresponding nut.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
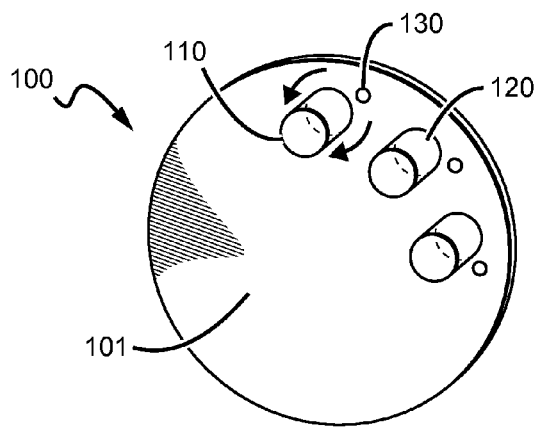
FIG. 1A is a top view of one embodiment of a safety apparatus.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

In some aspects of the inventive subject matter, safety devices of various shapes, sizes and configurations are contemplated to fit on any object having a nut. A device can comprise a ring-shaped base sized and configured to couple with a wheel of a car, truck, tractor, airplane, combine, bicycle, trailer, bus, van, motorcycle, or any other suitable land, water, or air vehicle having a nut. A device can comprise a base sized and configured to couple with one or more nuts or bolts on a rotating object other than a wheel, including for example, a wind turbine, helicopter, ship, boat, oil platform, pump railway track, rollercoaster, or any other suitable land, water, or air object having a nut. A device can also be configured for use on a non-rotating object, including a base of a pole or pillar, a table, or any other non-rotating object having a nut.

In some embodiments, a base could comprise a stiff material configured to extend between two or more nuts coupled to one or more objects. In other embodiments, a base could comprise two pieces of a stiff material slideably attached to each other and configured to extend between two or more nuts separated by various distances. Still further, a base can comprise a flexible material configured to extend around various shapes to couple two or more nuts.

A safety device in accordance with the inventive subject matter can be especially useful in industries where vehicles or other objects are subject to differential thermal contractions or extreme vibrations, such as the drilling or agricultural industry. For example, combines, tractors, and other farm equipment are often driven over bumpy or uneven surfaces where one tire can be driven over hard wet soil while another tire is driven over dry tilled soil. Such environmental variations can cause farm equipment to experience large amounts of vibrations, which could contribute to the loosening of wheel nuts.

Viewed from another perspective, some contemplated safety apparatuses of the inventive subject matter visually indicate nut looseness, and comprise a base having outside and inside surfaces or portions (often referred to herein as top and bottom portions, respectively), inwardly open nut caps rotatably coupled with the base and protruding from the outside of the base. The apparatuses could also comprise nut rotation indicators coupled with some or all of the nut caps, extending radially from a nut cap at the inside of the base, and configured to rotate with the corresponding nut cap. Additionally or alternatively, a plurality of alert holes in the base could be peripherally surrounded by material of the base and positioned proximate to the nut cap, wherein a rotation of the nut cap (via a rotation of a corresponding nut) causes a portion of the rotation indicator to become exposed through a corresponding alert hole. Additionally or alternatively, a formation (e.g., a retention wall, etc.) at the inside of the base could block or limit rotation of a nut cap and corresponding nut in a nut loosening direction in respective positions in which the indicators are retained or prevented from moving from behind the base and are yet exposed to view through one or more alert holes. Contemplated formations could comprise a retention wall or a stop at an edge (perimeter) of the base.

Additionally or alternatively, safety apparatuses of the inventive subject matter could comprise one or more electronic sensors to obtain at least one of nut data and wheel data.

Figure 1B:
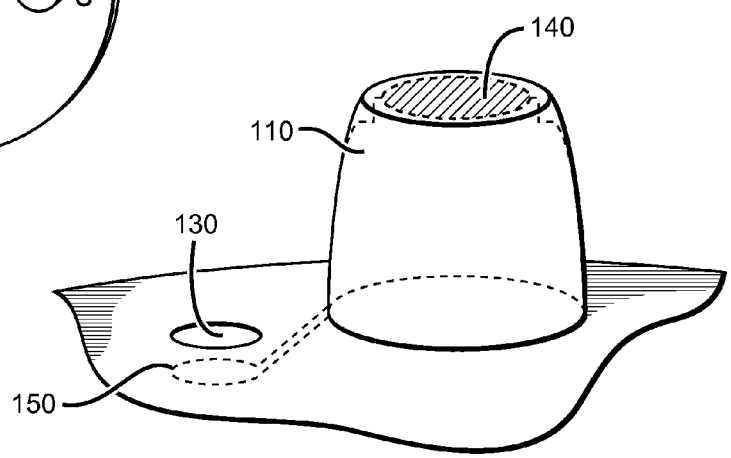
FIG. 1B is a side partial view of a nut cap of the safety apparatus of FIG. 1A.

FIGS. 1A-1B show a circular embodiment of a safety device of the inventive subject matter and a close-up portion thereof. Device 100 comprises a plurality of nut caps (e.g., 110, 120) rotatably coupled with a base 101. Nut cap 110 is snap or press fit with base 101, and configured to freely rotate therein. Nut cap 110 protrudes from a top (outer) portion of base 101, and comprises a nut rotation indicator 150 that can be integral with nut cap 110 and extends from a bottom (inside) portion of base 101. Indicator 150 is configured to rotate with nut cap 110 within a range (e.g., 45°, 75°, 90°, 180°, 360°, etc.) such that indicator 150 can be viewed through alert hole 130 within that range. As used herein, the term "integral" means comprising the same work piece. For example, where X is integral with Y, X and Y comprise a single work piece.

Each device 100 can be molded from or otherwise constructed using any suitable material or materials. Some devices can include a plastic material or a Nylon material. Other contemplated materials include, for example, a metal, steel, chrome, polypropylene or any other suitable material. More preferred embodiments can include a Nylon 6-6 material. Some exemplary devices are Nylon-based and generally comprise a synthetic fiber known as Nylon 6-6, re-enforced with Silica for superior heat and friction resistance. Example material can include Grilon TSS/4 schwarz 9832 offered by EMS-CHEMIE. The melting point is approximately 180-260 degrees Celsius, and more specifically, approximately 256 degrees Celsius. Contemplated materials can be insoluble in water, and have a density of 0.9 to 1.1. Nylon 6-6 has a chemical 'memory' which allows it to revert back to its original shape, therefore the device fits tightly and snugly once pushed over a nut, but it is straightforward to fit and remove. Its design is such that splines, whether tapered or not, allow a nut to be covered by the nut cap whilst in any position. The use of Nylon 6-6 can have various advantages over other materials such as polypropylene. For example, Nylon 6-6 is an engineering plastic, while polypropylene is a commodity thermoplastic. Nylon 6-6 has physical properties that are considered advantageous over other materials, over polypropylene for example. Example advantageous properties include for example, a higher melting point, a greater resistance to corrosion, heat and abrasion, a better texture and feel, or a longer life. Moreover, Nylon 6-6 allows for a strong interference fit with a nut or nut supporting surface, while polypropylene apparently does not because Nylon 6-6 offers a stronger shape memory. For example, a nut cap comprising Nylon 6-6 will retain its shape through highly fluctuating temperatures while a polypropylene lacks such a capability.

Contemplated materials can additionally or alternatively be corrosion resistant and thus robust against saltwater, heat, dirt, and other damaging elements, making a device suitable for use on underwater oil platforms, race cars, farm equipment, mining equipment, or any other suitable object. Corrosion resistant materials can comprise for example, chrome, Nylon, nickel, dezincification resistant brasses, etc., and are resistant to various causes or types of corrosion, including for example, atmospheric corrosion, seawater corrosion, soil corrosion, galvanic corrosion, rust, oxidation, or chemical breakdown.

In some embodiments, a base material can be compatible with vacuum metallization for an enhanced appearance or corrosion resistance (e.g., a chrome finish). All known materials suitable for vacuum metallization are contemplated. For example, the material to be coated can comprise a plastic, metal, ceramic, or a Nylon, and the coating material can comprise an aluminum, copper, platinum, titanium, chromium, chromium titanium, gold, lead, nickel, silver, tin, or other materials.

Figure 2:
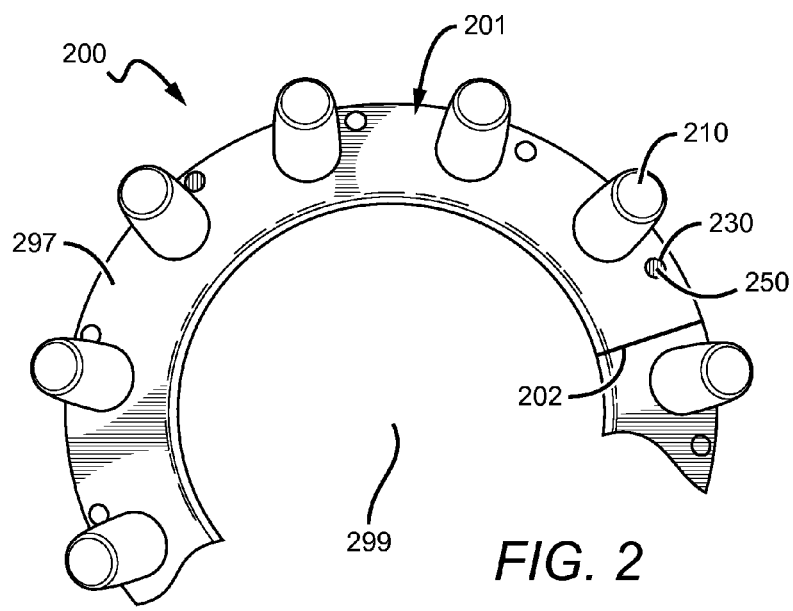
FIG. 2 is a top partial view of another embodiment of a safety apparatus.
Figure 2B:
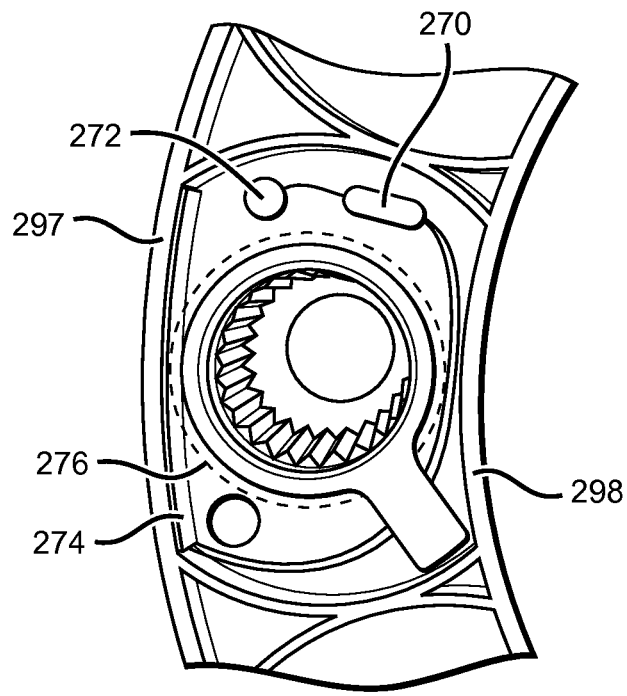
FIG. 2B is a bottom partial view of a nut cap and retention wall of the safety apparatus of FIG. 2.
Figure 2C:
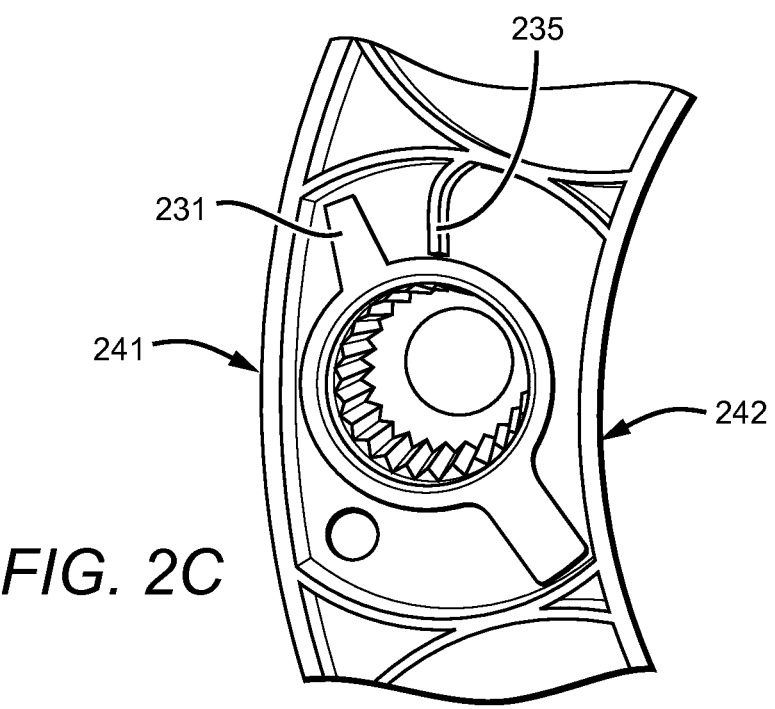
FIG. 2C is a bottom partial view of a different nut cap of the safety apparatus of FIG. 2.

FIGS. 2, 2B, and 2C show portions of a ring-shaped embodiment of a safety device of the inventive subject matter. Device 200 is a nut management system, primarily for vehicle wheels, which can both visibly indicate there is a loose nut and lock that nut in place until it can be re-torqued.

Device 200 comprises 10 nut caps (7 shown), indicators, and alert holes. The indicators of device 200 are peripherally surrounded by material of the base. Contemplated bases, such as base 201, can comprise a material of any suitable width (e.g., 202). In some ring shaped embodiments, the base can have a width of 1, 2, 3, or even 8 or more inches wide. Contemplated devices can comprise any suitable number of alert holes, nut caps, indicators, and other components, including 1, 2, 4, 8, 10, or even 16 or more of any component or components.

Nut cap 210 freely rotates inside a base or fixing plate. If a nut (not shown) rotates, its corresponding nut cap 210, snugly fitting to the nut (e.g., via an interference fit), rotates with the nut and causes nut rotation indicator 250 to rotate along an indicator pathway 276 (e.g., towards an alert hole, etc.). The result of the rotation can then be clearly seen through an alert hole 230 as the nut rotation indicator 250 moves along an inside surface of the base or fixing plate molded into the base. At the edge of the base is a retention wall 297, part of the design of the overall apparatus, which prevents the nut rotation indicator 250 from rotating any further, and extends at the inside of the base to help define one or more recessed portions of an inside surface of the base. The arm will, in some embodiments, not move further than the retention wall. As the arm is coupled with the nut, further rotation or de-torqueing of the nut is consequently arrested, yet an indication of a loosening of the nut is viewable via exposure of one or more indicators through corresponding alert holes. Device 220 further comprises a contact region 274, which could comprise one or more wires, etc. that, upon contact with a conductive portion (e.g., tip, etc.) of indicator 250, sends a signal to an electronic sensor 270, disposed along a recess/indicator pathway of the base. The electronic sensor could be powered by a power source 272, which can comprise a coin or button cell, a photovoltaic cell, a battery, or any other suitable power source.

As mentioned above, the nut caps (e.g. 210) can comprise internal tapered splines and a void, which allows for a universal fit to nuts of various shapes or lengths, and a vacuum fit. Once fitted to the nut, the material composing the nut cap attempts to return to its original molded shape, thus creating a firm grip on the nut (e.g., an interference fit, partial or nearly full vacuum seal, etc.). When one side of the nut cap is pulled, the other side pushes in so that the only way to release the interference fit or vacuum seal is to squeeze or rotate the nut cap with a hand or tool (e.g., pliers or wrench that is specifically designed to fit a first and second surface of a nut cap). This tool can be used to break a possible partial or complete vacuum that might form between the nut and the nut cap.

It is contemplated that some devices can be completely protected against tampering by permanently locking onto a nut or other portion of an object. For example, a molding material such as pitch, silicon, resin, epoxy, or other molding material can be inserted into the nut cap. Such features are considered to increase the security of the fit while also allowing the user to remove the device when desired.

Some or all of the nut caps can be coupled with the base and rotate therein within restrictions. Moreover, each nut cap can be press fit or snap fit to a base via a thin flange on the nut cap above the base, and a larger flange with nut rotation indicator below the base. Contemplated nut caps can have a smooth outer surface to protect road users from rough edges, such as those on wheel nuts and studs. The indicators can comprise a fluorescent portion, metallic portion, white portion, shiny portion, matte portion, or any other portion that easily stands out from the base to alert an observer.

A ring shaped device having a retention wall 297 and second wall 298 can also comprise an empty center region 299 that accepts a protrusion of an object, such as a hub. Such configurations are considered applicable to vehicles (e.g., trucks, etc.) having protruding hubs, wind turbines having central hubs, or any other object having a protrusion. If such a device also comprises a nut rotation indicator, it can be restricted from rotating to an inner center region 299 (e.g., restricted to an outer portion of the device, or between the first and second walls).

In FIG. 2B, a bottom view of a portion of device 200 is shown to highlight retention wall 297 and second wall 298, as well as the nut cap 210 and indicator 250 integral with the nut cap. FIG. 2C is a bottom view of a different portion of device 200, having a flange 231 and first stop 235 near a mid-line of the base. It is contemplated that flange 231 and stop 235 can be located on any portion of the device, and be configured to restrict the rotation of a nut cap or shorten the distance an indicator can move (e.g., from a mid-portion starting point to a wall, rather than from a first wall to a second wall). This restriction can occur before an indicator reaches an alert hole, at the same time the indicator reaches the alert hole, or in the event the retention wall fails to block rotation of a nut. Moreover, an indicator integral to a nut cap can be used to block a rotation of a nut cap, while a non-integral indicator (i.e., where the indicator and nut cap do not compose a single work piece) further rotates.

A device can have 0, 1, 2 or even more retention walls or rotation stops for each nut cap. Thus, a device can lack retention walls and stops altogether, comprise a retention wall but lack a stop, comprise a stop but lack a retention wall, or any other suitable configuration.

As used herein, a "stop" or "rotation stop" is used broadly to include any piece of material of any suitable size and shape that is configured to block a rotation of a nut cap, either directly or indirectly.

In devices having a stop but lacking a retention wall, a rotation indicator can be configured to start in a hidden position when a corresponding nut is tight, and move to an exposed position beyond an outer or inner edge (e.g., first edge 241, second edge 242, etc.) of the device when a corresponding nut is loose. A stop can also act to block a rotation indicator from rotating back towards the base, once exposed. For example, a device can have an indicator configured to begin at a hidden position (e.g., under a base portion), and rotate to an exposed position (e.g., beyond a diameter of the base, etc.), thereby changing the overall perimeter shape of the device. The stop could then act to block an indicator from moving towards a second hidden position approximately 120-180 degrees away from the original hidden position. A stop could also act as a ratchet, preventing an indicator from rotating back to the original hidden position. These and some other embodiments would not require an alert hole, and could be beneficial in industries, such as the mining or agricultural industries, where darkness or dirt might obfuscate the appearance of a retention arm through an alert hole.

Consider the following mining use case. A device configured for use on a mining device, such as a backhoe loader or a hydraulic excavator, could quickly become covered in dirt during use. Once covered, a rotation indicator may not be visible through an alert hole. However, a rotation indicator that rotated beyond an edge of the device can change the overall shape of the perimeter of the device and render the rotation apparent to an inspector. If the device further comprises a rotation stop, a nut corresponding to the rotation indicator could be restricted from further rotation towards the base (e.g., within the edges of the base).

Alternatively or additionally, a retention wall could be slideably coupled to the device such that a nut rotation indicator would push the retention wall outwards when a corresponding nut loosens. It is contemplated that the retention wall could be configured to slide outwardly by at least 1 mm, 5 mm, 10 mm, or even 50 mm away from the edge of the device, thereby changing the overall shape of the device. It is further contemplated that there can be a distinct retention wall slideably coupled to each nut rotation indicator. In these instances, only the retention wall corresponding with the single nut rotation indicator would move outwardly, thereby changing the overall shape of the device and retention rim from a circle to a circle with a protruding wall. Such embodiments would also be beneficial for objects used in extreme conditions.

In some preferred embodiments, the base, retention wall, or other portion of the device can be configured to substantially seal against a nut supporting surface of an object (e.g., a car, a wheel rim, a machine, etc.) coupled with a safety device. Such embodiments can keep the nut supporting surface or other portions of the object substantially free from water, dust, and other undesirable elements. A component of the device (e.g., a retention wall, second wall, etc.) can be sized and dimensioned to allow a flush fit with a nut supporting surface of an object that it couples with. This can protect the nut supporting surface against contamination or corrosion from the environment.

Figure 3:
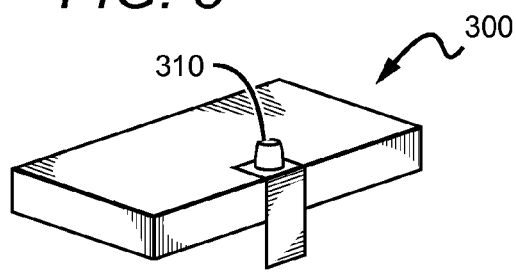
FIG. 3 is yet another embodiment of a safety apparatus having only one nut cap.

FIG. 3 shows a device 300 comprising a single nut cap 310, which could be coupled to a table, machine, wheel rim, or other object. Nut cap 310 could also be viewed as a single stand-alone nut cap having a rotation indicator.

Some contemplated devices can comprise additional rotation indicators or an electronic component, such as an electronic wheel sensor or electronic nut rotation sensor that allows an operator to obtain an alarm, signal, display, or other notification of a rotational or environmental state of the nut or wheel to which it is coupled. For example, an electronic nut rotation indicator can be configured to provide digital rotation data of a nut, including for example, an angle of rotation, a torque, a torsion, a rate of rotation, a trend of rotation, historical rotation data, or other digital rotation data. Such data is considered advantageous on numerous fronts. In embodiments where a device such as device is deployed on a wheel of a vehicle, the vehicle owner can obtain, or otherwise view, the data to determine rotational state or environmental state of the nuts. Further, safety professionals can obtain to the data can track historical information or trends in the nut data for analysis. Still further, nut manufacturers can obtain the data to determine performance data associated with their products. A device of the inventive subject matter could include one or more (e.g., 1, 2, 3, 4, 5, 6, 7, 8, 9, 10, etc.) electronic sensors on any suitable portion thereof, including for example, an outer surface of a base, an inside surface of a base, a recess of a base, an indicator pathway of a base, within a nut cap, on a retaining wall, or any other suitable location.

A nut cap (or any other portion of the device e.g., base, recess of a base, indicator pathway, etc.) can further comprise an electronic sensor (e.g., FIG. 1, item 140) configured to acquire and store digital data of a corresponding nut or wheel.

It is contemplated that digital nut data could comprise rotational data as described above, or non-rotational environmental data, including for example, a force, a sheer, a stress, a strain, a tightness, a log of data, a compression, a tension, a temperature, a number of rotations, an imbalance, a wobble, a density, a vibration, or other environmental data related to the nut or object to which it is attached (e.g., a wheel, etc.). One should appreciate that the environment data can cover a broad spectrum of information about the nut. All possible data related to a nut is contemplated.

Digital sensor data can be presented using any suitable modality, including for example, visual or audible. This data can be communicated to a person of interest through a screen or speaker on the device itself, or at another location that is communicatively coupled to the device. For example, an operator or technician responsible for the nut can receive the digital nut data on a screen or speaker coupled to a dashboard or other interior portion of a vehicle, a cellular phone, a computer, a personal digital assistant, a tablet computer, a watch, or any other suitable object worn by the operator. As used herein, the term "communicatively coupled" includes both wired and wireless communication coupling. Examples of wireless coupling include coupling via near field communications, cellular networks, WiFi networks, remote controls, RFID, wireless USB, dedicated short range communications, IrDA, or any other suitable wireless communication channels. One should appreciate sensor 140 can include a passive sensor or an active sensor. A passive sensor provides sensor data in response to a query (e.g., RFID, etc.).

In some embodiments, an electronic sensor comprises an active sensor that can be coupled to a power source or power converter, including for example, a photovoltaic cell, a battery, a thermocouple, or other power source or converter. In such embodiments, the active sensor is configured to provide nut or wheel data under its own accord. It is contemplated that the power source or power converter can, similarly to one or more electronic sensors, be attached to any suitable part of the device, or an object coupled to the device, including for example, a nut cap, a base, the brakes of a car to which the device is coupled, or any other part of the device or object.

It is further contemplated that an electronic nut sensor can comprise a wireless interface, including for example, a Bluetooth®, Zigbee®, 802.11, WUSB, WiFi, or other wireless interface.

Examples of electronic sensors include, but are not limited to: (1) active sensors, for example powered, broadcasting, some RFID-based, or other types of active sensors; or (2) passive sensors such as other RFID-based, strain gauges, or other types of passive sensors. An RFID-based sensor can either be active, i.e. powered by a battery or other power source, or passive, i.e. powered by the electromagnetic fields used to read them. Contemplated sensors include for example, temperature sensors, rotation counters, balance monitors, accelerometers, vibration monitors, strain or stress gauges, compression or tension gauges, torque sensors, torsion sensors, RFID tags, video cameras, tachometers, or other sensors. Further, contemplated devices can include additional elements such as electronic circuits capable of controlling electronic aspects of the device including sensor data acquisition, LED displays, speakers, or other types of devices.

It is contemplated that an electronic sensor could also serve as a nut rotation indictor. In some preferred embodiments, one or more of the nut rotation indicator(s) could be distinct from the electronic sensor(s). An example of a nut rotation indicator that is distinct from an electronic sensor includes a tab coupled to a nut cap that rotates with the nut cap upon rotation of the nut.

Figure 4A:
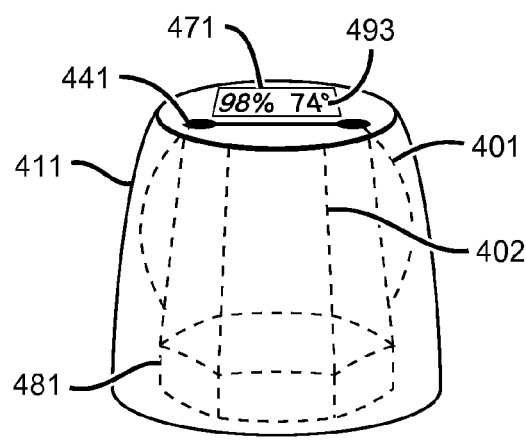
FIG. 4A is a perspective view of a nut cap.

FIG. 4A is an example of a nut cap 411 comprising tapered splines 402 and a combined electronic sensor/nut rotation indicator 441 coupled to a nut 481 through wires 401, as well as a display screen 471. The display screen 471 is configured to present digital nut data 493 (e.g. temperature) of the corresponding nut 481, as well as an indication of a rotation of the corresponding nut 481, for example, the percent of original tightness remaining, wherein 100% is equivalent to no rotation and 0% is equivalent to a 360 degree rotation.

It is contemplated that a nut cap can be configured to only partially cover a corresponding nut. However, preferred embodiments include one or more nut caps that are configured to completely cover a corresponding nut thereby keeping the nut substantially free of dust and other unwanted debris.

While this and some other examples herein are directed towards a nut cap comprising an electronic sensor, it is contemplated that the electronic sensor could be disposed on a base of the device and coupled to a contact region placed to come into contact with a rotating indicator upon a loosening of a nut. Such a sensor could obtain data indicating the loosening of the nut and provide an alert (e.g., via a display on the safety device or a distal computing device, etc.). It is also contemplated that an electronic sensor could be disposed in or on a nut cap of the inventive subject matter and configured to obtain sensor data relevant to a wheel that it is coupled to.

Figure 4B:
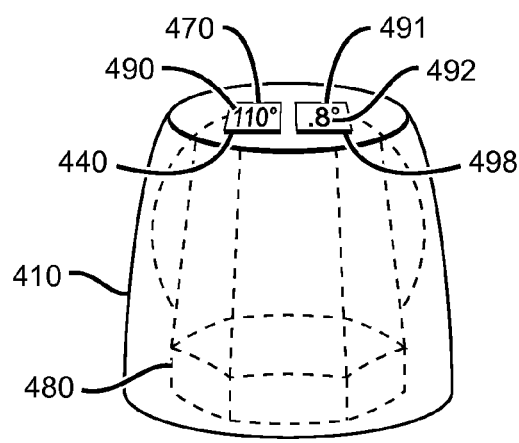
FIG. 4B is a perspective view of another nut cap.

FIG. 4B is an alternative example of a nut cap 410 comprising an electronic sensor 440 and a distinct nut rotation indicator 498, each directly coupled to a nut 480. Digital nut or other data 490 is displayed on screen 470, and an indication related to a nut or wheel 492 (e.g., digital rotation data), such as a degree of rotation from a starting point, is displayed on screen 491.

It is contemplated that the digital sensor data 490 or indication of a rotation of a nut could comprise real-time data that is streamed to the display screen 470 or to a communicatively coupled display screen. Such communicatively coupled display screen 470 can be on a dashboard or other interior portion of a vehicle, on a cellular phone, a computer, a personal digital assistant, a tablet computer, a watch, or any other suitable display (e.g., in a control center associated with a company or companies, etc.). The coupling could be wire-based or comprise a wireless channel of communication, including for example, near field communications, cellular networks, WiFi networks, remote controls, RFID, wireless USB, dedicated short range communications, or any other suitable communication channels.

Figure 5:
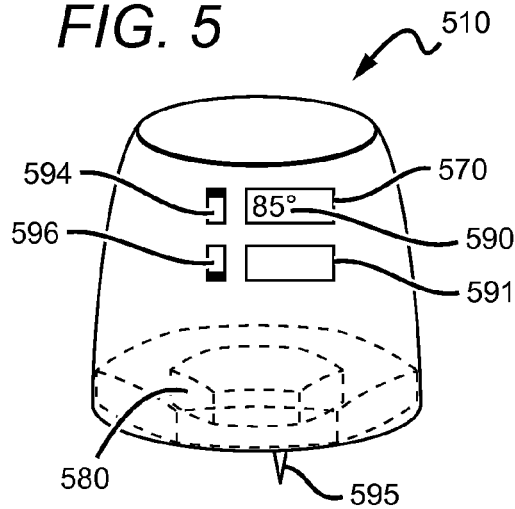
FIG. 5 is a perspective view of yet another nut cap.

FIG. 5 shows nut cap 510, which can be coupled with a base, or be a single stand-alone nut cap. The nut cap 510 comprises two separate nut rotation indicators. The first indicator is a tab 595 coupled to nut cap 510 and configured to rotate with nut cap 510 so that a viewer could see how far a nut has rotated with respect to its starting point. The second indicator (not shown) could be the same as, or distinct from, an electronic sensor (not shown). Nut cap 510 further comprises actuators/switches 594 and 596 coupled to display screens 570 and 591 respectively. Display screen 570 displays a digital nut data 590 of a corresponding nut 580 when actuator/switch 594 is turned on.

Nut caps can comprise any suitable size and shape. For example, a nut can be a tapered cylindrical shape having a first diameter of approximately 1.2-1.5 inches, a second diameter of approximately 0.75-1 inch, and a length of 1.6-2 inches, a cylindrical shape having a diameter of 1.25 inches and a length of 1.2 inches, or any other suitable shape and size.

Figure 6:
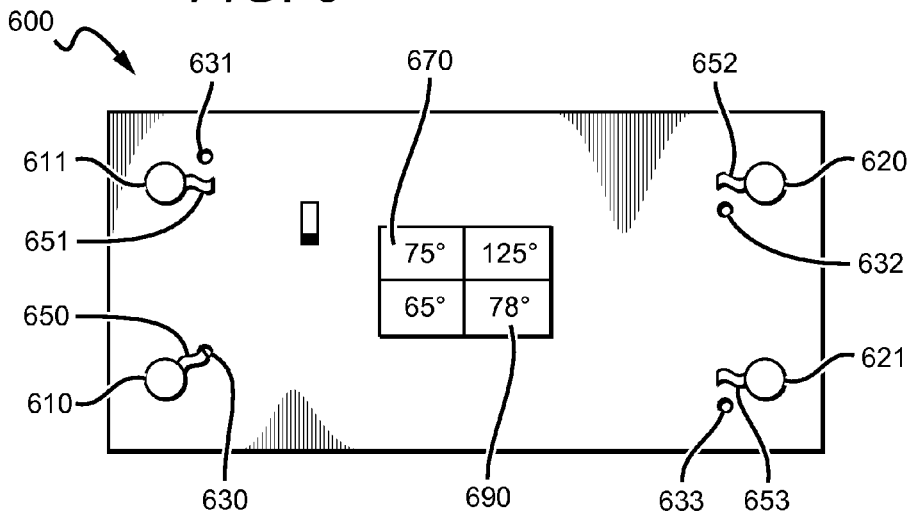
FIG. 6 illustrates an LED screen showing real-time digital nut data.

FIG. 6 illustrates a device 600 comprising a display screen 670, such as an LED screen, showing real-time digital nut data (e.g. 690). Display screen 670 is configured to display digital nut data of corresponding nuts (not shown, covered by nut cap 610, 611, 620 and 621) in real-time. Digital nut data 690 on the lower right hand portion of the display screen 670 corresponds to the nut covered by nut cap 621 and is in the process of changing from 78 degrees to 79 degrees. Each of the nut caps 610, 611, 620 and 621 is coupled to a nut rotation indicator 650, 651, 652 and 653 respectively, which can move into an exposed position through corresponding alert holes 630, 631, 632, and 633.

Contemplated indicators can comprise different colors, images, or letters that appear through the alert hole when different levels of rotations occur. Thus, a device can indicate not only a rotation, but an amount of rotation relative to a starting point.

Additionally or alternatively, a device of the inventive subject matter could include one or more lights (e.g., LED lights, etc.) that could act as an indicator, or be used as a decorative element, for example, as an advertisement for a company who owns or operates a truck using the safety apparatuses.

Figure 7:
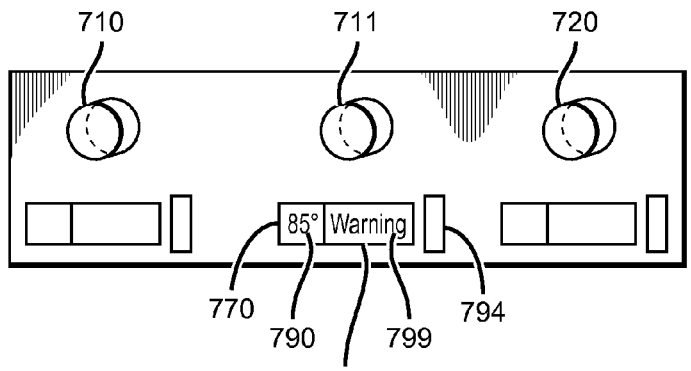
FIG. 7 illustrates an LED screen showing both individual nut data and aggregate nut data.

FIG. 7 illustrates a device comprising three nut caps 710, 711 and 720, and display screens 770 and 793, such as LED screens, showing both individual nut data 790 and aggregate nut data 799. It is contemplated that the nut data (790 or 799) could be secured through an authorization or authentication mechanism. Such mechanism could restrict the access to nut data (790 or 799), or restrict whom deletions or other modifications to the nut data could be made by. Thus, it is possible that access to the nut data could be restricted to an operator, owner, inspector and insurance adjuster, while those who can make modifications to the nut data could be limited to an inspector and insurance adjuster. Contemplated authorization methods include the requiring of a pin code, password, or any other predetermined set of numbers, letter or words. Contemplated authentication methods include the use of fingerprint detectors, iris detectors, voice recognition systems, or any other suitable authentication methods. Here, nut cap 711 is coupled to a corresponding biometric sensor 794 (e.g. a fingerprint detector) and display screens 770 and 793. Display screen 770 shows a digital nut data 790 of corresponding nut (not shown), while a second display screen 793 shows an aggregate data 799 of two or more nuts (e.g. under nut caps 710 and 711) coupled to the device (e.g. a warning sign when at least one of the nuts are within 5 degrees of a predetermined maximum allowable temperature). As noted above, the data displayed by the screens could additionally or alternatively comprise data associated with an object to which the device is attached (e.g., a wheel, etc.) and could comprise individual object data, or aggregate object data.

Figure 8:
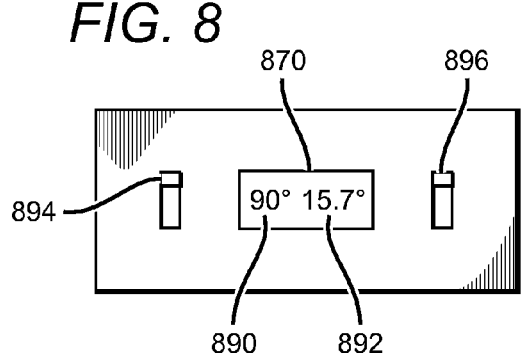
FIG. 8 is an example of an LED screen showing both digital nut data and an indication of a rotation of a nut.

FIG. 8 is an example of a device comprising a single display screen 870, wherein the digital nut data 890 is configured to appear upon actuation of switch 894, and an indication of a rotation of a nut 892 is configured to appear upon actuation of switch 896. It is further contemplated that a screen could be coupled to three or more switches or actuators and configured to display three or more pieces of information (e.g. a digital nut data 890, a rotation of a nut 892, an aggregate data of two of the nuts (not shown), and an aggregate data of all of the nuts (not shown)).

Figure 9:
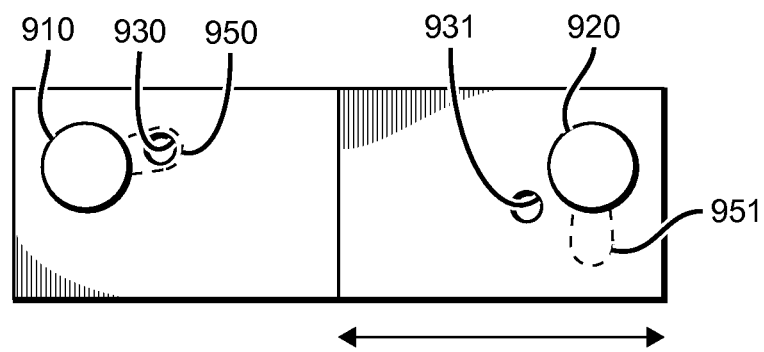
FIG. 9 is an illustration of two slideably attached bases.

FIG. 9 illustrates a device comprising two base portions slideably attached to one another. Each base comprises an alert hole 930 or 931, and is coupled to a nut cap (910 or 920) and nut rotation indicator 950 or 951. Such a configuration could allow a user to use a single device on multiple objects where the individual nuts of a device are positioned at different distances relative to one another.

Figure 10:
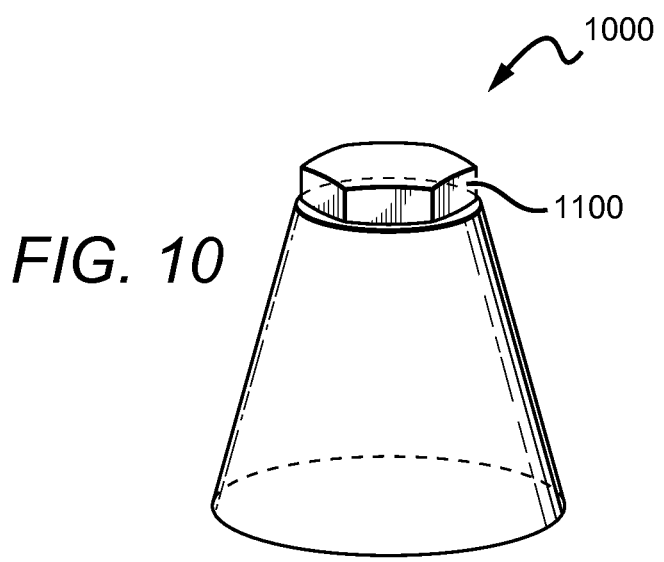
FIG. 10 is an illustration of a nut cap comprising a wrench acceptor.

It is contemplated that nut caps could comprise any suitable shape, including a cone, a cup, a cube, or a cylinder. The outside lining of the nut caps could be sized and configured to accept a wrench or other tool, such as a monkey wrench, open end wrench, box-end wrench, ratcheting box wrench, combination wrench, adjustable wrench, socket wrench, an Allen wrench, a Bristol wrench, an alligator wrench, a lug wrench, or a flare-nut wrench. An example of a nut cap sized and configured to accept a wrench is shown in FIG. 10. It is contemplated that the wrench accepting portion 1100 could be located at any portion along the outer lining of the nut cap 1000. Such portion can allow a user to readily tighten a corresponding nut (e.g. covered by nut cap 1000) without removing the safety device from the object to which it is coupled. It is further contemplated that a single nut cap 1000 could comprise two or more wrench accepting portions, each configured to accept a different wrench.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A safety apparatus comprising:
a base having an outside portion and an inside portion;
a nut cap rotatably coupled with the base and protruding from the top portion of the base;
a nut rotation indicator coupled with the nut cap and configured to rotate with the nut cap, wherein the nut rotation indicator is positioned to juxtapose the inside portion of the base;
at least one electronic sensor coupled with the base and configured to obtain at least one of a nut data and a wheel data.

2. The safety apparatus of claim 1, wherein the base comprises a retention wall sized and dimensioned to limit a rotation of the nut rotation indicator.

3. The safety apparatus of claim 2, further comprising a contact region coupled to the retention wall and configured to contact the nut rotation indicator.

4. The safety apparatus of claim 1, wherein the at least one electronic sensor is disposed on an indicator pathway of the base.

5. The safety apparatus of claim 1, wherein the at least one electronic sensor is configured to obtain the nut data, and wherein the nut data comprises a rotation.

6. The safety apparatus of claim 1, wherein the at least one electronic sensor is configured to obtain the wheel data, and wherein the wheel data is associated with at least one of a wheel rotation, a wheel temperature, a wash-boarding, an imbalance and a wobble.

7. The safety apparatus of claim 1, wherein the at least one electronic sensor is at least partially covered by a rubber composite.

8. The safety apparatus of claim 1, further comprising a power unit coupled with the at least one electronic sensor and disposed on the base.

9. The safety apparatus of claim 1, further comprising at least one light configured to provide a visual alert when the contact region comes into contact with the indicator.

10. The safety apparatus of claim 9, wherein the visual alert comprises at least one of a turning on, a turning off, a change in color, a change in brightness and a change in pattern in the at least one light.

11. The safety apparatus of claim 1, wherein the at least one sensor is configured to transmit sensor data to a display of a device via a sensor interface.

12. The safety apparatus of claim 11, wherein the device comprises at least one of a mobile phone, a computer and a tablet.

13. The safety apparatus of claim 11, wherein the device is located in a control center associated with a company monitoring a plurality of safety apparatuses.

14. The safety apparatus of claim 1, wherein the nut cap is press fit with the base and configured to freely rotate with respect to the base.

15. The safety apparatus of claim 1, wherein the nut cap comprises tapered internal splines.

16. The safety apparatus of claim 15, wherein the nut cap is configured to form a partial vacuum seal around the corresponding nut.

17. The safety apparatus of claim 1, further comprising a nut rotation indicator coupled with the nut cap and configured to rotate with the nut cap, wherein the nut rotation indicator is positioned to juxtapose the inside portion of the base, and wherein the base comprises an alert hole that allows at least a portion of the nut rotation indicator to be viewed through the outside portion of the base.

18. The safety apparatus of claim 1, wherein the base is a ring-shaped base.

19. The safety apparatus of claim 1, wherein the base is configured to substantially seal against a nut supporting surface of an object to which the apparatus is coupled.

* * * * *